United States Patent [19]

Venable

[11] 4,149,806

[45] Apr. 17, 1979

[54] METHOD AND APPARATUS FOR HANDLING LIQUIDS THAT ARE TO BE FOAMED-IN-PLACE AS AN INSULATIVE BARRIER

[76] Inventor: Jesse S. Venable, Rte. #3, Herington, Kans. 67449

[21] Appl. No.: 839,296

[22] Filed: Oct. 4, 1977

[51] Int. Cl.$^2$ .............................................. B01F 15/06
[52] U.S. Cl. ................................ 366/144; 165/107 R; 366/159
[58] Field of Search ............... 366/144, 145, 146, 148, 366/159; 137/340, 563; 165/61, 107

[56] References Cited

U.S. PATENT DOCUMENTS

| | | | |
|---|---|---|---|
| 3,128,995 | 4/1964 | Shaeffer | 366/145 |
| 3,180,350 | 4/1965 | Rill | 366/145 |
| 3,265,365 | 8/1966 | Ward | 366/145 |
| 3,948,490 | 4/1976 | Troope | 366/144 |

*Primary Examiner*—Robert W. Jenkins
*Attorney, Agent, or Firm*—Burns, Doane, Swecker & Mathis

[57] ABSTRACT

In an apparatus for the foaming-in-place of insulation, liquid resin and liquid foaming agent components are carried in first and second containers. These liquids are to be mixed together and the mix is to be foamed-in-place within a void to be insulated. Heating and cooling mechanisms are coupled to the conainers for selectively heating and cooling the liquids to maintain them within a prescribed temperature range. The heating and cooling mechanisms comprise part of a temperature control unit through which the liquids are selectively circulated from their respective containers. The temperatures of the liquids are monitored within the containers. In the event that the sensed temperature falls outside of the prescribed range, the temperature-control unit is automatically actuated to heat or cool the liquid.

10 Claims, 4 Drawing Figures

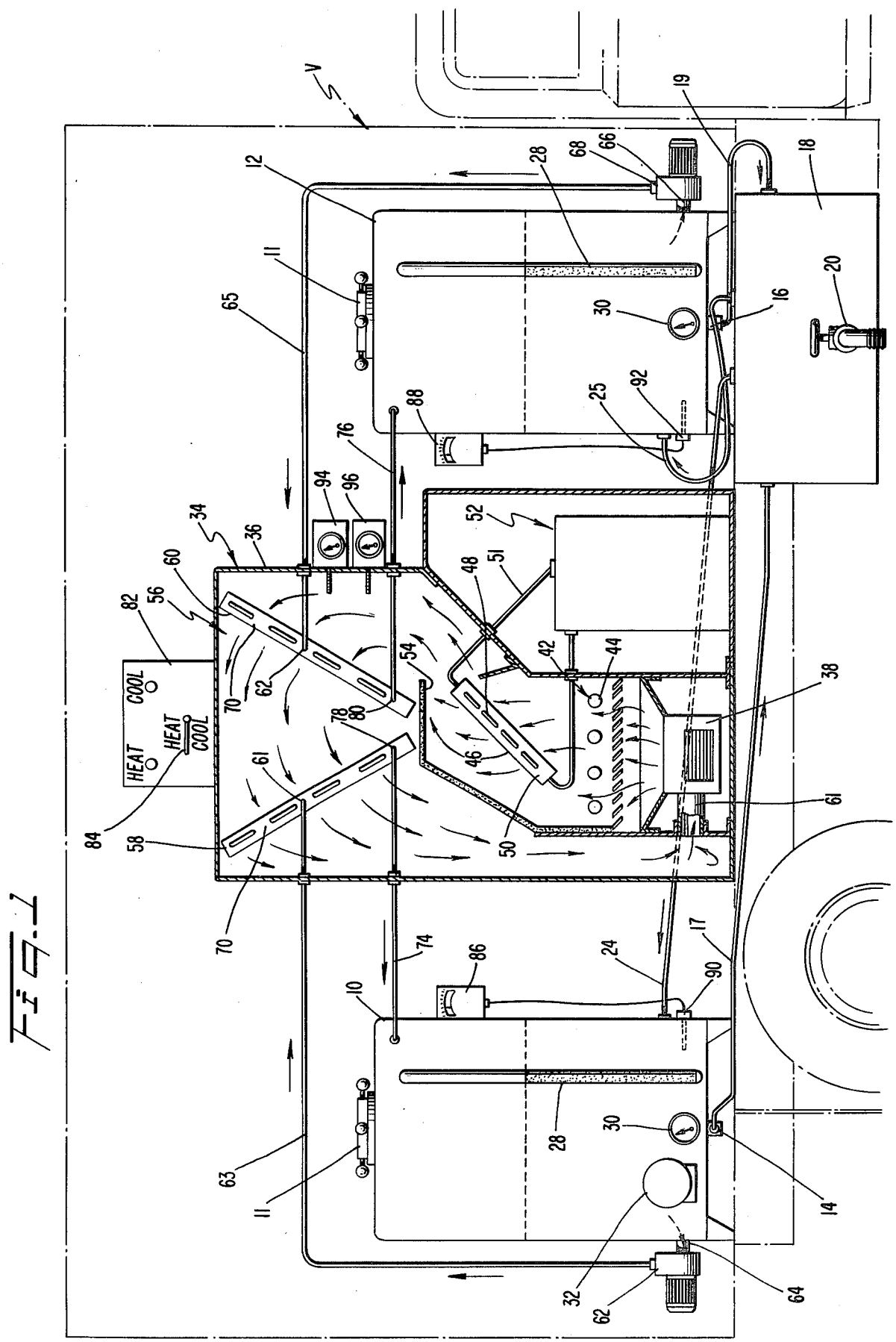

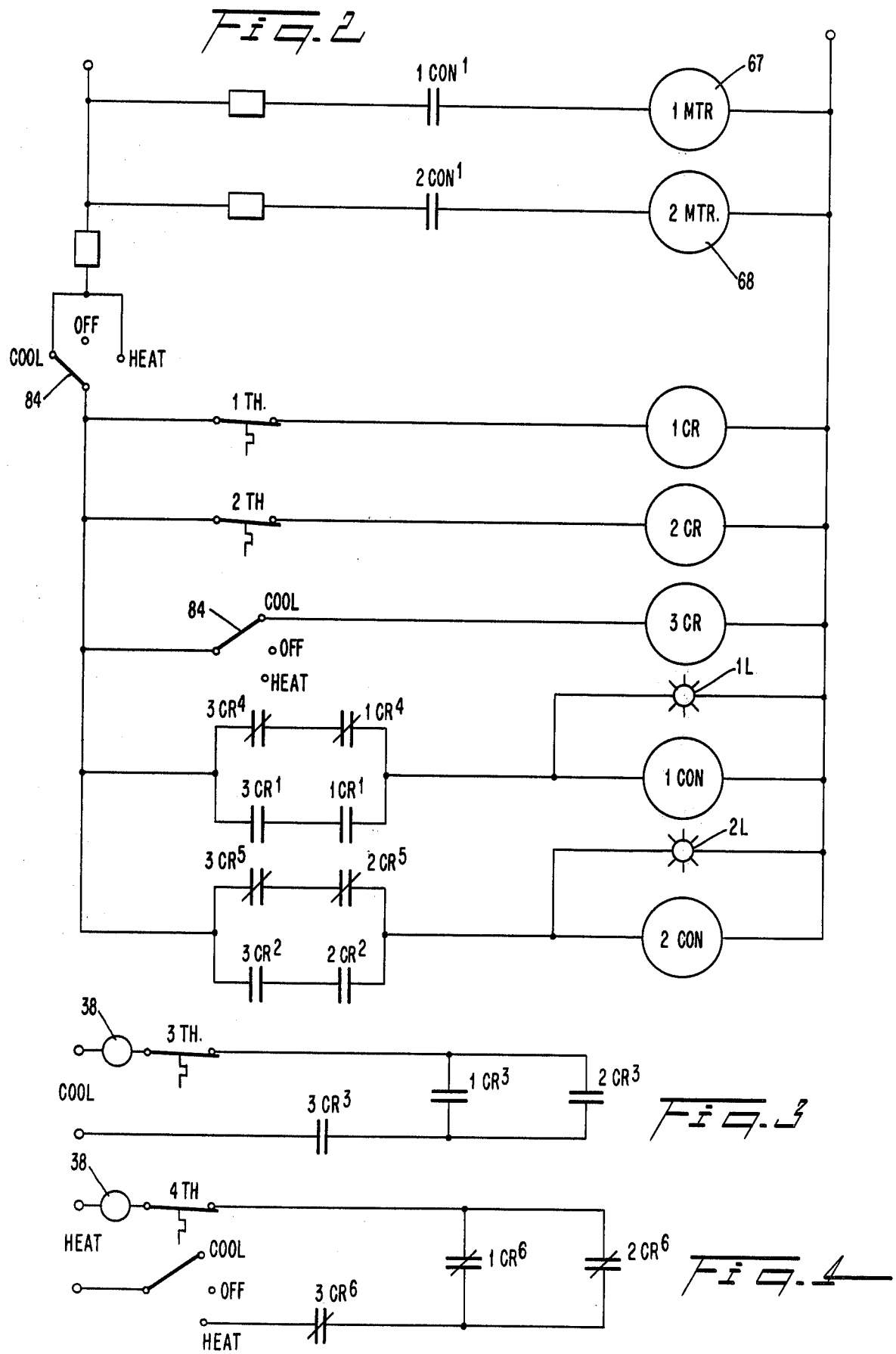

METHOD AND APPARATUS FOR HANDLING LIQUIDS THAT ARE TO BE FOAMED-IN-PLACE AS AN INSULATIVE BARRIER

BACKGROUND AND OBJECTS OF THE INVENTION

The present invention relates to the handling of liquid materials which are to be intermixed and foamed-in-place within walls to form a thermal insulating barrier.

The placement of thermal insulating barriers by the foaming-in-place of foamable compositions is well known. For example, a foamable plastic composition is introduced in liquid form into the cavity of a wall to be insulated, such as a building wall. The liquid can be pumped through a foaming applicator into the cavity. Typically, the foamable composition comprises a mix of resin, such as ureaformaldehyde for example, and a foaming agent, which are carried in separate drums. Outlet conduits from the drums lead to a common mixing pump which mixes the liquids and flows the mixture to an applicator gun dispenser through which they are discharged into the void being insulated.

The most efficient and effective placement of insulation in this manner occurs when the resin and agent are within a specified temperature range. At temperatures outside of this range there may occur less than complete foaming, or in the case of large temperature differences, the materials may not flow properly and may be subject to rapid chemical break-down. For example, during the winter months it may be necessary to apply a blowtorch to the drums in order to heat the liquid to a temperature at which it is flowable. As a result, it has been heretofore practiced to employ materials in small amounts which can be fully dispensed before the temperature thereof rises excessively above or falls excessively below the specified temperature range. Thus, it may be necessary to replace or replenish the drums any number of times in order to complete an insulating job.

It is, therefore, an object of the present invention to eliminate or obviate problems of the above-discussed sort.

It is another object of the present invention to enable liquid components of foamed-in-place insulation to be carried in greater doses, thereby minimizing the frequency of replacing or replenishing such doses during a given job.

It is a further object of the invention to assure that foamed-in-place liquid insulation components are mixed under conditions which induce complete expansion of the foam.

It is an additional object of the present invention to eliminate the chances that foamed-in-place liquid components will break-down chemically during the application procedure.

It is yet another object of the present invention to provide a temperature control unit to which the liquid components of foamed-in-place insulation are circulated to maintain their temperatures within a prescribed range.

BRIEF SUMMARY OF THE INVENTION

These objects are achieved by the present invention in which liquid resin and liquid foaming agent components are carried in first and second containers. These liquids are to be mixed together and the mix is to be foamed-in-place within a void to be insulated. Heating and cooling mechanisms are coupled to the containers for selectively heating and cooling the liquids to maintain them within a prescribed temperature range.

Preferably, the heating and cooling mechanisms comprise part of a temperature control unit through which the liquids are selectively circulated from their respective containers.

Preferably, the temperatures of the liquids are monitored within the containers. In the event that the sensed temperature falls outside of the prescribed range, the temperature-control unit is automatically actuated to heat or cool the liquid.

THE DRAWING

The objects of the present invention will become apparent from the following detailed description of a preferred embodiment of the invention in which like numerals designate like elements and in which:

FIG. 1 is a side elevational view of a liquid handling system according to the present invention. The system is depicted as being mounted on a vehicle, and a temperature control unit of the system is broken away to expose liquid temperature control structure carried thereby;

FIG. 2 is a schematic circuit diagram for the present invention;

FIG. 3 is a schematic circuit diagram for a refrigeration component of the system; and FIG. 4 is a schematic circuit diagram for a heater component of the system.

DETAILED DESCRIPTION OF A PREFERRED EMBODIMENT OF THE INVENTION

A system for handling foamable insulation includes first and second containers 10, 12 for carrying a foaming agent and a resin material, respectively. Preferably, the resin is ureaformaldehyde. The containers 10, 12 are each of considerable size. For example, two tanks each having a capacity of 220 gallons have been employed. A removable closure 11 is provided on each tank for refilling purposes. The containers 10, 12 include discharge outlets 14, 16 at lower ends thereof to which may be connected hoses 17, 19 which lead to a pump-mixer unit 18. This unit is of conventional construction and may be purchased from Scientific Application, Inc., a distributor of Raperswill Corp. of New York, N.Y. The pump-mixer unit draws liquids from the containers 10, 12, pressurizes them, and discharges the mixture through an outlet 20. The outlet 20 can be connected by a hose of suitable length to a conventional applicator gun (not shown) of the type which can be purchased from the Raperswill Corp. of New York, N.Y. Such an applicator gun comprises an outlet nozzle and trigger for opening and closing the nozzle.

Excess liquids are returned to the tanks from the pump-mixer unit 18 through return lines 24, 25.

The containers each include standard measuring instruments such as a sight gauge 28 to detect the level of liquid therewithin, and a thermometer 30 for measuring the temperature of liquid within the container. The foam agent container may be provided with an agitator pump 32 to agitate the liquid contained therein.

Disposed adjacent the containers is a control circuit or unit 34 which functions to selectively heat or cool liquids in the containers to automatically maintain the temperature of the liquids within a predetermined range.

The control circuit 34 comprises a housing 36 which is substantially enclosed and includes a blower mechanism 38 for circulating air therethrough. Situated immediately thereabove within the housing is a heating mechanism 42. The heating mechanism preferably comprises a gas-burning heat exchanger in which heated air is conducted through coils 44 and causes air traveling across the coils to be heated. Alternatively, electrical heating elements could be substituted for the gas heat exchanger.

Above the heating mechanism 42 is located a selectively operable cooling mechanism 46. The cooling mechanism 46 comprises coolant coils 48 and cooling fins 50 situated in the air path. Connected via conduits 51 to the cooling coils 48 is a refrigeration unit 52 which conducts a refrigerant fluid through the coils. The refrigeration unit can be of conventional construction, including a compressor, condenser, evaporator and expansion valve operating under a common vapor-compression refrigeration cycle. During operation, cooled refrigerant fluid is cycled through the cooling coils 48 to lower the temperature of the passing air.

The heating and cooling mechanisms are alternately operable so that the air is either heated or cooled.

Situated above the cooling mechanism is an air deflector plate arrangement 54 which directs air from the cooling mechanism toward the inlet of a heat exchange mechanism 56.

The heat exchange mechanism 56 comprises a pair of liquid coil units 58, 60 which are spaced apart in the direction of air flow.

One coil unit 58 is fluidly connected to the foaming agent container 10 and the other coil unit 60 is fluidly connected to the resin container 12. The coil units 58, 60 include inlets 61, 62 which are connected via conduits 63, 65 to diverting outlets 64, 66 of the associated container. The diverting outlets 64, 66 of the containers 10, 12 include fluid pumps 67, 68 which are operable to transfer liquid from the containers 10, 12 and through the associated heat exchanger coils 58, 60. In so doing, the liquid is acted upon by the passing air and is either heated or cooled, depending upon the particular mode of operation then in effect. Heat transfer fins 70 are mounted on the coils to intensify such heat transfer.

Return lines 74, 76 at discharge ends 78, 80 of the coil units 58, 60 serve to return the treated liquid back to the associated container.

After the air traverses the resin coils 60 and the foaming agent coils 58, it is conducted to the inlet side 61 of the blower 38 and recirculated.

By proper operation of the control circuit 34, the resin and foaming agent liquids can be maintained within a specified temperature range. Although the cycling pumps 67, 68 and the heating and cooling mechanisms 42, 46 could be actuated by manual control if desired, it is preferable that they be operated automatically.

A suitable control circuit for affording automatic operation can be devised by one of ordinary skill in the art. The present invention is not characterized by any particular control circuit per se.

A representative form of automatic control circuitry for operating the temperature control system is represented in FIG. 2. In this regard, a control box 82 is mounted atop the housing 36 and includes a control switch 84 which is selectively actuable between heating and cooling modes of operation. The temperature range with which the foaming agent and resin are maintained is selected by means of conventional thermostats 86, 88 which are mounted on the respective containers 10, 12.

Each thermostat 86, 88 includes a dial for selecting a prescribed temperature or temperature range. This temperature value is compared with the temperature of liquid in the associated container, sensed by a standard temperature probe 90, 92. When the liquid temperature rises above the prescribed temperature range, a switch 1TH and/or 2TH of the thermostats 86, 88 is closed. In the event that the liquid temperature falls below the prescribed temperature range, the switch 1TH and/or 2TH is opened.

In the event, for example, that the control switch 84 has been set for a "cool" mode of operation, as would occur during times of warm or hot ambient temperature, then the closing of switches 1TH and/or 2TH serves to energize relays 1CR and/or 2CR.

At the same time, a relay 3CR is energized. In this fashion, the normally open contacts 3CR1, 1CR1 and/or 3CR2, 2CR2 are closed to energize contactors 1CON and/or 2CON. Accordingly, the normally open contacts 1CON1 and/or 2CON1 are closed to activate one or both of the cycling pumps 67, 68 for cycling foaming agent and/or resin through their respective heat exchangers 58, 60. Simultaneously, indicator lights 1L and/or 2L on the control box are energized to indicate which pumps are operating.

Energization of the relays 1CR and/or 2CR with 3CR causes normally open contacts 1CR3 and/or 2CR3 and 3CR3 in the cooling circuit (FIG. 3) to close so as to activate the cooling mechanism and the blower 38. When the liquid temperature falls below the prescribed temperature range, the switches 1TH and 2TH open and the cooling system is deactivated.

In the event that the control switch has been set to a "heat" mode of operation, and the liquid temperatures fall below the prescribed temperature, the normally closed contacts 3CR4 and 1CR4 and/or 3CR5 and 2CR5, energize the contactors 1CON and/or 2CON to operate the cycling pumps 67, 68. At the same time, the normally closed contacts 1CR6 and/or 2CR6, and 3CR6 in the heating circuit (FIG. 4) actuate the heating elements 42 and blower 38. Accordingly, heated air is circulated within the housing 36 to heat the liquids which are circulated through the heat exchangers 58, 60. When the liquid temperatures reenter the prescribed temperature range, the control system is deactivated.

A pair of thermostats 94, 96 (FIG. 1) are provided for sensing the temperature of the air being circulated within the housing 36. The thermostat 94 includes a switch 3TH (FIG. 3) for deactivating the cooling circuit in the event that the air reaches an excessively low temperature, such as 35° F. or below for example, to prevent freeze-up of the system. The thermostat 96 includes a switch 4TH (FIG. 4) for deactivating the heating circuit in the event that the air reaches an excessively high temperature, such as 130° F.

By regulating the temperatures of the liquid foaming agent and liquid resin, such liquids can be used in large doses without fear of incomplete foaming, or chemical breakdown. It is thus practicable to employ containers of relatively large capacity. Such containers can be mounted adjacent the temperature control unit upon a vehicle V. The conduits extending to the applicator gun are of relatively long length to enable the applicator gun to be carried to the structure being insulated.

OPERATION

In operation, liquid foaming agent is carried in the first container 10 and liquid resin is carried in the second container 12. Conduits 17, 24 are connected between the pumping unit 18.

The thermostats 86, 88 are set to regulate the temperatures of the liquids within a specified range, such as 68°-70° F., for example. If the ambient temperature is above the range, then the control switch 84 is set on "cool"; if ambient temperature is below this range, the control switch is set on "heat".

The foaming-in-place operation is then initiated. If the temperature of either liquid rises above the prescribed temperature range during a "cool" mode, then the thermostat switch 1TH or 2TH associated with such liquid automatically actuates the appropriate pump or pumps 67, 68, the blower 38, and the refrigerating unit 52. As a result, air is circulated through the temperature control housing 36 by the blower 38 and is cooled by the cooling mechanism 46. Simultaneously, the liquid to be cooled is circulated from its container 10 or 12, through its heat exchanger 58, 60 wherein it is cooled, and then back to its container. When the liquid temperature reenters the specified range, the pump 67 or 68, blower 38, and refrigeration unit 52 are deactivated. It will be appreciated that one or both liquids may be circulated through their respective coils 58, 60 at a given time, with the circuit 34 functioning in either a heating or cooling mode.

In the "heat" mode, similar actions take place when the sensed temperature falls below the specified temperature range, except that the heating elements 42 are activated instead of the refrigeration unit, so that the air, and consequently the liquid, is heated.

The liquid dispensing operations through the foam pump 18 are carried out independently of the operation of the temperature control unit. That is, dispensing can continue even as the liquids are being circulated through the coils 58 or 60, since only a portion of the liquid is circulated within the temperature control unit at a given instant.

In the event that air temperatures within the temperature control unit become excessively high or low, the safety thermostats 94, 96 will deactivate the heating-/cooling system.

SUMMARY OF MAJOR ADVANTAGES AND SCOPE OF THE INVENTION

By virtue of the fact that the temperatures of the liquid foaming agent and liquid resin are maintained at ideal foaming temperatures, highly efficient use is made of the insulation materials. Since temperature fluctuations are no longer a problem in adversely affecting performance or causing chemical breakdowns of the liquids, the liquids can be employed in relatively large doses, thereby minimizing the frequency of replenishing or replacing the containers. It is also advantageous that the dispensing activities may be continuously carried out even while liquids are being circulated through the temperature control unit.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for use in the foaming-in-place of insulation material wherein a liquid foaming agent and a liquid resin are mixed and introduced into a void to be insulated, said apparatus comprising:
    a first container for carrying liquid foaming agent,
    a second container for carrying liquid resin,
        said liquids, when mixed, being foamable-in-place within a void to provide an insulation barrier; and
    a temperature control unit comprising:
        a housing,
        means for circulating a fluid through said housing,
        means selectively actuable for heating the circulating fluid,
        means selectively actuable for cooling the circulating fluid,
        a first heat exchanger positioned for heat exchanging contact with the circulating fluid and connected to said first container,
        means for circulating liquid foaming agent through said first heat exchanger, to heat or cool such foaming agent,
        a second heat exchanger positioned for heat exchanging contact with the circulating fluid, and connected to said second container, and
        means for circulating liquid resin through said second heat exchanger to heat or cool such resin.

2. Apparatus according to claim 1, wherein said heating and cooling means comprises a temperature control unit containing a heating mechanism and a cooling mechanism, means for activating alternate ones of said heating and cooling mechanisms, and means for circulating said liquids through said unit to selectively heat and cool same.

3. Apparatus according to claim 1 including means for sensing the temperatures of liquids in said first and second containers and for actuating said heating means when one of said temperatures falls below a prescribed temperature range and for actuating said cooling means when one of said temperatures rises above said prescribed temperature range.

4. Apparatus according to claim 1, wherein said means for circulating fluid comprises means for circulating air in a cyclical path through said housing, said heating means comprises a heat generating member disposed in said path, means for activating said heat generating member to heat the air, said cooling means comprising cooling coils disposed in said path, and means for circulating a refrigerant through said cooling coils to cool the air.

5. Apparatus according to claim 4, wherein said first and second heat exchangers each comprises coils for receiving a liquid flow; and said means for circulating liquid foaming agent and said means for circulating liquid resin each comprise a pump.

6. Apparatus according to claim 5 including means for sensing the temperatures of liquids in said first and second containers and for actuating said heating means when one of said temperatures falls below a prescribed temperature range and for actuating said cooling means when one of said temperatures rises above said prescribed temperature range.

7. Apparatus for the foaming-in-place of insulation of the type in which a liquid foaming agent and a liquid resin are mixed and introduced into a void to be insulated, said apparatus comprising:
    a first container for carrying liquid foaming agent,
    a second container for carrying liquid resin,
        said containers each including an outlet for connection thereof to a liquid discharge means, a temperature control unit comprising:
  a housing,
  means for circulating air cyclically through said housing,
  a heating mechanism disposed in said air path for heating the air,
  a cooling mechanism disposed in said air path for cooling the air,
  a first heat exchanger in said air path for conducting liquid foaming agent in heat exchanging relationship with the air, and
  a second heat exchanger in said air path for conducting liquid resin in heat exchanging relationship with the air; and
pumping means for circulating said liquid resin and said liquid foaming agent from said containers, through associated ones of said heat exchangers for changing the temperature of said liquids, and back to said containers.

8. Apparatus according to claim 7, including means for sensing the temperatures of said liquids in said containers and for:
  actuating said heating means and said circulating means when the temperature of at least one of said liquids falls below a prescribed temperature range to circulate said one liquid through said temperature control unit to heat said liquid, and
  actuating said cooling means and said circulating means when the temperature of at least one of said liquids rises above said prescribed temperature range to circulate said one liquid through said temperature control unit to cool said liquid.

9. Apparatus according to claim 7, wherein said temperature control unit comprises a housing, means for circulating air cyclically through said housing, a heating mechanism disposed in said air path for heating the air, a cooling mechanism disposed in said air path for cooling the air, a first heat exchange in said air path for conducting liquid foaming agent in heat exchanging relationship with the air, and a second heat conducting liquid resin in heat exchanging relationship with the air.

10. A method of handling liquid foaming agent and liquid resin that are to be mixed and introduced into a void to form foamed-in-place insulation therein, said method comprising the steps of:
  carrying said liquid foaming agent in a first container;
  carrying said liquid resin in a second container;
  sensing the temperatures of said liquids in said containers;
  when the sensed temperature of at least one of said liquids falls below a prescribed temperature range, circulating such liquid from its container, through a heated zone to increase the temperature of such liquid, and back to its container; and
  when the sensed temperature of at least one of said liquids rises above said prescribed temperature range, circulating such liquid from its container, through a cooled zone to lower the temperature of such liquid, and back to its container.

* * * * *